US011191287B2

United States Patent
Beth Halachmi et al.

(10) Patent No.: US 11,191,287 B2
(45) Date of Patent: Dec. 7, 2021

(54) COOLING SYSTEM AND APPLIANCE FOR PRODUCING COOLED EDIBLE PRODUCTS

(71) Applicant: SOLO GELATO LTD., Hila (IL)

(72) Inventors: Barak Beth Halachmi, Hila (IL); Jacob Rand, Herzliya (IL); Eynav Kliger, Moshav Betzet (IL); Ilan Dabelsteen, Shilat (IL); Adi Atlas, Kiryat Ono (IL); Bilal Saudi, Tayibe (IL)

(73) Assignee: SOLO GELATO LTD., Hila (IL)

( * ) Notice: Subject to any disclaimer, the term of this patent is extended or adjusted under 35 U.S.C. 154(b) by 95 days.

(21) Appl. No.: 16/469,931

(22) PCT Filed: Dec. 13, 2017

(86) PCT No.: PCT/IL2017/051345
§ 371 (c)(1),
(2) Date: Jun. 14, 2019

(87) PCT Pub. No.: WO2018/109765
PCT Pub. Date: Jun. 21, 2018

(65) Prior Publication Data
US 2019/0320679 A1 Oct. 24, 2019

(30) Foreign Application Priority Data

Dec. 15, 2016 (IL) .......................................... 249593
Dec. 15, 2016 (IL) .......................................... 249595

(51) Int. Cl.
*A23G 9/22* (2006.01)
*A23G 9/16* (2006.01)

(52) U.S. Cl.
CPC ............... *A23G 9/222* (2013.01); *A23G 9/16* (2013.01); *A23G 9/224* (2013.01)

(58) Field of Classification Search
CPC .......... A23G 9/222; A23G 9/16; A23G 9/224; F25B 2339/024; F25B 2339/0242; F25D 23/061; F25D 31/006; F25D 17/02; F25C 1/145; F28F 5/06
See application file for complete search history.

(56) References Cited

U.S. PATENT DOCUMENTS

| 3,147,601 | A | | 9/1964 | Tacchella |
| 4,205,535 | A | | 6/1980 | Maurer |
| 4,696,166 | A | | 9/1987 | Bukoschek et al. |
| 5,363,659 | A | * | 11/1994 | Lyon ...................... F25C 1/142 |
| | | | | 62/345 |
| 5,447,039 | A | | 9/1995 | Allison |
| 5,881,565 | A | | 3/1999 | Coventry |
| 6,286,332 | B1 | | 9/2001 | Goldstein |

(Continued)

FOREIGN PATENT DOCUMENTS

| EP | 0 311 158 A2 | 4/1989 |
| EP | 0 400 700 A1 | 12/1990 |
| EP | 0 729 707 A2 | 9/1996 |

(Continued)

*Primary Examiner* — David J Teitelbaum
(74) *Attorney, Agent, or Firm* — Vorys, Sater, Seymour & Pease LLP; William Klima

(57) ABSTRACT

Provided is a cooling chamber, cooling system and an appliance for producing cooled edible products, such as ice cream, sorbets, frozen yogurt, foamed cooled drinks, etc.

6 Claims, 8 Drawing Sheets

(56) References Cited

U.S. PATENT DOCUMENTS 6,971,174 B2 * 12/2005 Liu .................... B22D 11/0651
29/895
8,132,424 B2 * 3/2012 Burn ........................ F25C 1/14
62/345

FOREIGN PATENT DOCUMENTS

| EP | 1 027 832 A1 | 8/2000 |
| EP | 3 095 332 A1 | 11/2016 |
| FR | 1 335 916 A | 8/1963 |
| GB | 1 128 617 A | 9/1968 |
| WO | 97/27438 A1 | 7/1997 |
| WO | 2013/121421 A1 | 8/2013 |
| WO | 2015/022678 A1 | 2/2015 |

* cited by examiner

COOLING SYSTEM AND APPLIANCE FOR PRODUCING COOLED EDIBLE PRODUCTS

TECHNOLOGICAL FIELD

The present disclosure concerns a cooling chamber, cooling system and an appliance for producing cooled edible products, such as ice cream, sorbets, frozen yogurt, foamed cooled drinks, etc.

BACKGROUND

References considered to be relevant as background to the presently disclosed subject matter are listed below:
  WO 2013/121,421
  WO 2015/022,678

Acknowledgement of the above references herein is not to be inferred as meaning that these are in any way relevant to the patentability of the presently disclosed subject matter.

Domestic appliances for the preparation of cooled edible products are known, such as from PCT Patent Publication Nos. WO 2013/121,421 and WO 2015/022,678, mentioned above. The efficient production of high quality cooled edible products, such as ice cream, particularly in a small device suitable for domestic use, is a challenge. The challenges resides, among others, in the cooling system as well as in the specific physical parameters employed during the preparation process of the cooled edible product.

GENERAL DESCRIPTION

This disclosure provides, by a first of its aspects, referred herein as the "cooling aspect", a cooling chamber that may be employed in a home appliance for the preparation of a cooled edible product, such as ice cream; and a cooling system or an appliance comprising it.

A second aspect of this disclosure, referred to herein as the "processing aspect", concerns an appliance and a method for producing a cooled edible product.

These aspects may be used independently of one another although they may be combined. For example, a cooling chamber or system of said cooling aspect may be employed in the appliance or method of the processing aspect, and vice versa.

While each of these aspects will be separately described, in the specific exemplary embodiments illustrated in the annexed drawing, all are embodied in the same module and appliance.

The cooling aspect provides a cooling chamber with a cooling fluid entry port and a cooling fluid exit port connectable to respective source and drain of a cooling fluid (e.g. respective outlet and inlet of a refrigeration unit, cooling pump, etc.). A heat exchanger is defined within or associated with walls of the cooling chamber to thereby cool the walls of the chamber. There are at least two conduit system (typically, albeit non-exclusively, two) for the cooling fluid that define two functionally parallel flow paths for the cooling fluid between the entry and exit ports (that permit simultaneous flow of the cooling fluid in the two paths). For this purpose, said entry port may be associated and in fluid communication with an entry manifold element and said exit port may be associated and in fluid communication with an exit manifold element. These manifold elements are in fluid communication with the at least two conduit systems, defining corresponding at least two cooling fluid flow paths between the entry and exit manifolds.

Typically, the conduit systems consist of consecutive conduit segments, each being formed in or associated with different wall portions of the chamber. Such conduit segments, for example, may be in the form of tubes and made of a heat conductive material, particularly metal, that are fitted to the inside face of at least one such wall portion; or may, by another example, be constituted by bores or cavities formed within said wall portions. The bores or cavities may be lined with any suitable heat-conductive lining, e.g. a copper lining.

Thus, in some embodiments, the conduit systems are constituted by consecutive conduit segments, the conduit segments being bores or cavities formed within the walls of the cooling chamber. Unlike cooling systems which are based on external cooling coils, the conduit systems that are formed within the cooling chamber's walls (e.g. as bores or cavities within the walls through which the cooling fluid is circulated) enable utilizing the thermal mass of the cooling chamber in order to efficiently cool the content of the chamber and compensate for temperature fluctuation within the chamber.

A particular, albeit non-exclusive use of such cooling chamber and system is in an appliance for the production of cooled edible products, particularly in home appliances, of the kind disclosed in the above-mentioned PCT publications.

A particular example is the case of a cooling chamber that has a generally cylindrical shape having an axis that extends between two opposite end walls, the cylindrical shape defined by a circumferential axial wall. The conduit segments may include segments that extend between the two end walls. Such segments may be axially orientated, may be angled relative to the axis, may be configured to define a spiral path, or may have any other useful configuration.

A particular example of the conduit system is one that comprises a plurality of first segments extending between opposite end walls, e.g. axially orientated and linked at each end to one of a plurality of second, peripheral segments that are formed in said end walls, each said second segments linking two first segments that are consecutive in the flow path. Thus, the flow path comprises a succession of first and second segments.

The first segments may be defined by bores within the circumferential wall and the second segments may be defined by cavities at or within the end walls or an end wall portion or may be constituted by tubes linking consecutive two first segments.

In cooling systems with two of said conduit systems, a typical arrangement is that each of them is arranged in opposite portions of the circumferential wall. For example, in the case of a cylindrical cooling chamber, one conduit system is arranged at one portion that spans half the circumference of the circumferential wall, and the other conduit system is arranged at the opposite portion of said wall. Another exemplary configuration is one with three or four parallel conduit systems, each occupying a different circumferential portion; or one in which the different flow paths are inter-grated with one another.

In addition to providing efficient cooling of the chamber, the structure of the heat exchanger also minimizes the accumulation of fluid (e.g. oil) at the bottom part of the heat exchanger, thus enabling better circulation of the cooling fluid and maintaining cooling efficiency of the cooling system. Such an arrangement also improves manufacturability of the cooling chamber, as no cooling-fluid conducting coils (such as those known in the art) need to be wrapped and deformed around the chamber's walls (a process which is often complex), thus also reducing production costs.

The cooling aspect of this disclosure also provides an appliance comprising the above cooling chamber or system. The appliance may also comprise at least one, typically two or more temperatures sensors associated with the cooling chamber. The temperature sensors may be used to monitor and measure the temperature at various locations in the cooling chamber, thus enabling a controller receiving indications from the temperature sensors to control and modify of the temperature of the cooling fluid, the circulation/flow rate of the cooling fluid, the temperature of the chamber's walls, etc. The temperature sensors may also be used to collect data about changes in temperature within the cooling chamber during the preparation process of a cooled edible product, such that tailoring of the preparation process may be carried out on the basis of such data.

The appliance according to the processing aspect of this disclosure comprises a cylindrical processing chamber with circumferential walls, at least one (typically one) ingredients' inlet for introducing the ingredients that are used for the production of a cooled edible product, at least one (typically one) pressure inlet for introducing gas, e.g. air, into the chamber and an associated cooling arrangement configured for cooling the walls of the chamber. The at least one pressure inlet may be the same or different than the at least one ingredients' inlet. In the case of the typical configuration, with one inlet serving both these functions, the forced introduction of the ingredients (that typically comprise an aqueous medium, such as water, milk, cream, etc.) into the chamber is accompanied by some forced introduction of gas, typically air, along therewith, to thereby cause a pressure increase within the chamber. Namely, by some embodiments, the inlet constitutes an ingredients' inlet for introducing the ingredients and a pressure inlet for pressurizing the chamber (i.e. the ingredients' inlet and the ingredients and the pressure inlet being constituted by a single inlet serving both functions).

It is of note that the joint introduction of ingredients and pressure through the same inlet results in an atomizing effect of the ingredients, thereby maximizing the surface area of the ingredients mixture that comes into contact with the cooled walls of the processing chamber, allowing efficient cooling of the ingredients and initial crystallization in the process of turning the ingredients into a cooled edible product.

In order to improve such atomizing, the inlet may, by some embodiments, be formed with baffles or internal ribs to split the ingredients inflow into the processing chamber and/or introduce the ingredients into the processing chamber in a turbulent flow.

By another embodiment, a gas (typically air) at above atmospheric pressure is introduced into the chamber.

As will be explained below, it is a combination of such pressure and shearing forces imparted by the blending arrangement, jointly with cooling, that provides the physical conditions for the preparation of a cooled edible product (e.g. ice cream, soft serve ice cream, and others) with quality texture and mouthfeel.

The appliance according to the processing aspect also comprises, as noted above, a blending arrangement which has at least one blade that is proximal to an inner face of the circumferential wall. The at least one blade is revolvable within the processing chamber and capable, through such revolution, to scrape said inner face. The blending arrangement comprises typically 2, 3, 4 or at times more blades, revolving about and axial axle and arranged in axial symmetry to avoid angular moments during revolution. The blending arrangement is coupled to a motor for revolving said axle. By a typical example, the blade revolves at a rate of more than 200, typically more than 400 and at times even more than 600 rpm; revolving at about 800 rpm or even higher being a specific example. It is also of note that the blade may revolve in a constant speed throughout the production process or in a variable speed within said aforesaid range, depending on the parameters of the cooled edible product preparation process.

It is also of note that the revolving rate may be carried out at a sequence of different revolution rates. For example, the blending arrangement may first revolve at a rate of below 400 rpm in order to facilitate initial mixing of the ingredients within the processing chamber and allow sufficient contact time of the mixture with the cooled walls of the processing chamber in order to enable formation of initial ice crystals, and then the rate may be increased to above 400 rpm (at times above 600 rpm or even above 800 rpm) in order to prepare the cooled edible product.

As noted above, the processing chamber may be the cooling chamber of the cooling aspect hereinabove.

The appliance of the processing aspect also comprises a mechanism for forced introduction of the ingredients into the processing chamber under pressure. A pump, that pumps the ingredients with a gas (typically air) to thereby increase pressure within the processing chamber is a specific example of such mechanism.

Without being bound by theory, it is believed that the forced introduction of ingredients, particularly the liquid portion thereof, into the chamber and the consequent spraying thereof onto the cooled walls of the chamber plays a role in the eventual smooth and mouth-pleasing texture of the cooled edible product. Additionally, the abrupt pressure reduction of the liquid, with the other ingredients dissolved or dispersed therein at its point of entry into the chamber, with the concomitant cooling, also contributes to the eventual mouth-pleasing texture. Further, the combination of elevated pressure and high mixing speed enables to shorten the process duration of the preparation of a batch of cooled edible product, typically to below 2 minutes per preparation cycle, below 90 seconds or even below 60 seconds.

In accordance with one embodiment of this disclosure, the at least one ingredients' inlet is associated with a heating element. The heating element's function is to prevent clogging through freezing, which may otherwise occur. Alternatively, such clogging prevention may also be obtained by a vibrating element (typically an ultrasonic transducer), that causes both vibrations and local heating of the inlet to prevent freezing of the ingredients therein.

The appliance may further comprise a pre-mixing chamber to permit pre-mixing of solid (e.g. powder) ingredients with liquid ingredients to introduce the ingredients into the chamber in the form of a liquid, a solution, an emulsion, a slurry, a suspension or any other liquid form. The pre-mixing chamber is configured to be in liquid association with the ingredients' inlet. The pre-mixing chamber may be an integral part of the appliance, or may be constituted by an ingredients' container (such as a single-use pod or capsule that contains part of the ingredients) such that pre-mixing of the ingredients with a liquid is carried out within the container.

As noted above, and as can be appreciated, the processing chamber of the processing aspect of this disclosure may embody features of the cooling aspect of this disclosure, namely a heat exchanger that embodies the characteristics of that disclosed herein in reference to said cooling aspect.

The method for the preparation of a cooled edible product of the kind described above comprises introducing ingredients into a cooled processing chamber, while maintaining a pressure above atmospheric pressure, typically at least 10%, 20%, 30%, 40%, 50%, 75% or even 100% above the atmospheric pressure. By one embodiment, the introduction of the ingredients causes the increase in pressure within said chamber. The ingredients include an aqueous medium with dissolved or dispersed non-aqueous ingredients. The non-aqueous ingredients (e.g. withdrawn from a capsule) being a priori dissolved or dispersed in the aqueous medium or mixed with the aqueous medium during said introducing. Thus, when a capsule is used as a source of the ingredients, the capsule may contain only dry ingredients (to be mixed with a suitable aqueous medium), ingredients in a paste or concentrate form (to be further diluted with the aqueous medium), or at times contain the all of the ingredients to produce a single-serve portion of cooled edible product (i.e. without requiring addition of further aqueous medium). The aqueous medium may be water, flavored water, milk, non-dairy milk, dairy or non-dairy cream, yogurt, etc. Shear forces are then applied on the food ingredients, while maintaining the pressure and continuous cooling to thereby form said cooled edible product.

The pressure may be increased and maintained by forcing, e.g. through pumping, the ingredients into said chamber jointly with a gas, e.g. air.

The shear forces may be formed by a blending arrangement comprising at least one revolving blade. The chamber is typically cylindrical and the blades extend along the chamber's circumferential wall's inner face and have an edge proximal to said face. The blades typically revolve at a revolution rate of at least 200, 300, 400, 500, 600, or 700 rpm and may be about 800 rpm or by some embodiments even higher.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The embodiments disclosed in the annexed drawings, which will be illustrated below, incorporate the different aspects of this disclosure. In particular, the cooling chamber having a heat exchange arrangement, embodying the features of the first aspect, is employed as part of the cooled edible product preparation unit in accordance with the second aspect. However, as will be appreciated and further pointed out below, the different aspects may be employed independently in other embodiments.

Figure 1:
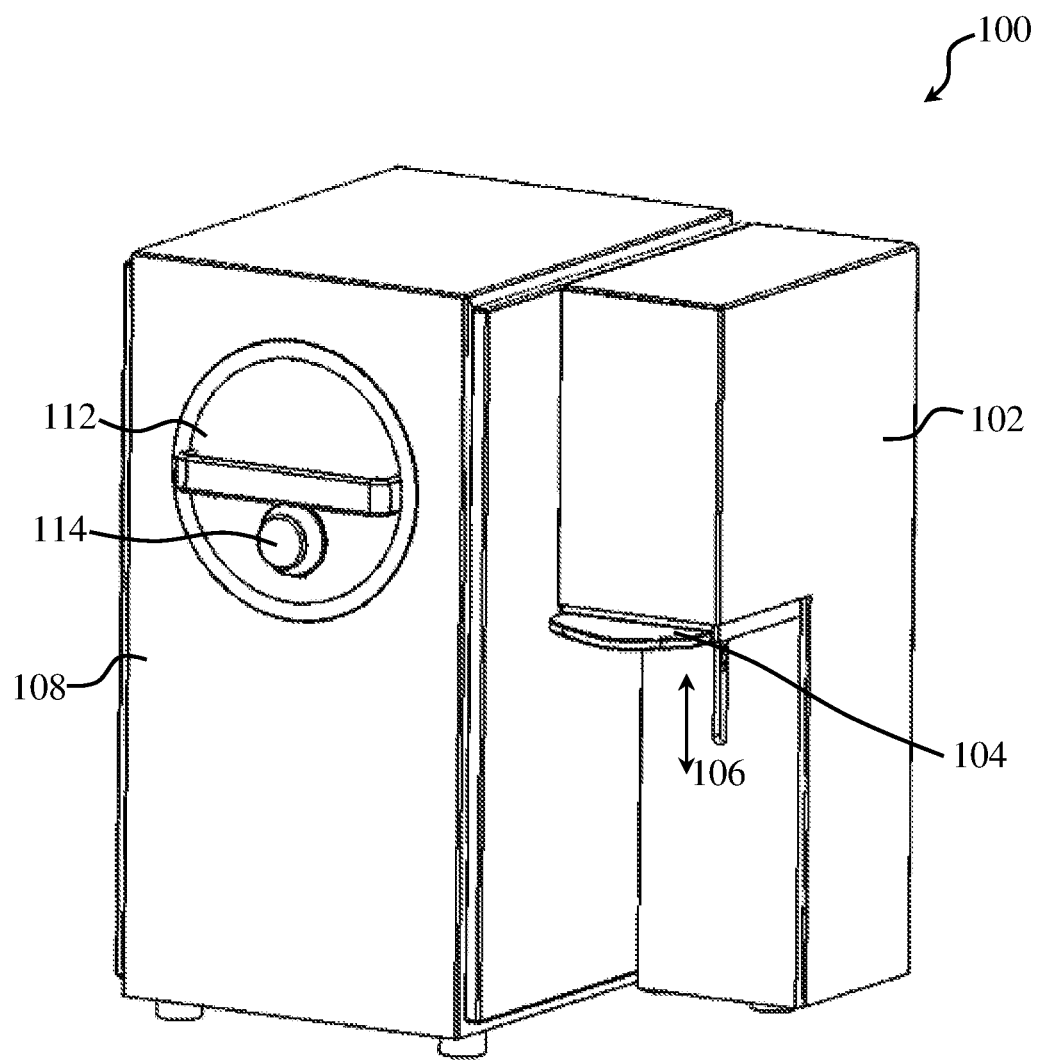
FIG. 1 is a schematic perspective view of an appliance according to an embodiment of this disclosure, for the production of ice cream.
Figure 2:
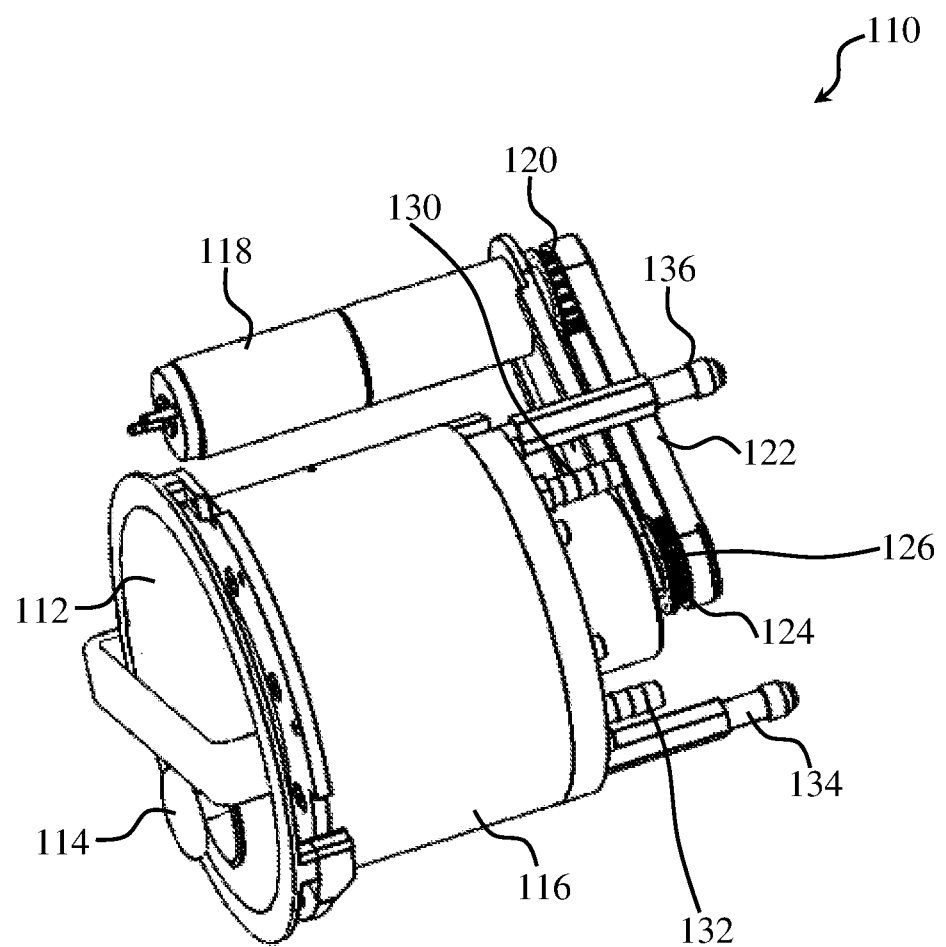
FIG. 2 is a schematic perspective view of the cooling and processing chamber and associated motor, according to an embodiment of this disclosure.

The appliance 100 incorporating exemplary embodiments of different aspects of this disclosure are as shown in FIG. 1. Appliance 100 is intended for the production of cooled edible products, particularly ice cream. This appliance is generally based on some structural and operational aspects disclosed in WO 2013/121,421 and WO 2015/022,678 and, in particular, uses disposable capsules that contain dry or wet ingredients for the preparation of ice cream.

Appliance 100 comprises a capsule bay 102 that includes a capsule placement tray 104 that can vertically reciprocate in the direction represented by arrow 106, between an open state (not shown) permitting placement of the capsule thereon and a closed state, as shown in FIG. 1, in which the tray 104 is in a fully upward position and the capsule is received within bay 102.

The appliance may also comprise a reservoir (not shown) that includes an aqueous liquid, such as water, milk, cream, non-dairy milk, etc. that is mixed with the capsule's content to produce a cooled edible product. It is to be appreciated that the aqueous liquid may be introduced into the appliance from a different source, i.e. from an external reservoir, a feed line (such as domestic water supply), batch-wise feeding by the user, etc.

The main housing portion 108 of appliance 100 houses the machinery used for production of a cooled edible product including the cooling chamber and its associated motor (to be described below), and a refrigeration unit for the supply of a cooling fluid, a pumping mechanism for withdrawing the food ingredients from the capsule, mixing them with aqueous liquid and introducing them into the cooling chamber, and others (the reader is referred, among others, to the aforementioned two PCT publications which disclose modules that may be included in such appliances).

Seen in FIG. 1 is the front face 112 of the cooling unit that can be removed to clean the chamber. Formed in face 112 is a dispensing opening 114 for dispensing of the cooled edible product upon completion of its preparation process.

In the following, emphasis will be made on elements of the cooling system which are embodies in the different aspects of this disclosure. The other auxiliary elements and modules, as noted above, may be, for example, those disclosed in said PCT publications or others. In describing the system, reference will be made to FIGS. 2-6B in combination.

Module 110, seen in FIGS. 2-6B, includes a cooling chamber 116 and associated electric motor 118 that has an integral sprocket wheel 120 coupled through belt 122 to a blending arrangement. The blending arrangement includes sprocket wheel 124 that is axially coupled to an axel 126 and three rotating blades 128, as will be described below in connection with FIGS. 3-5. The cooling chamber 116 has an ingredients' inlet port 130 for introducing food ingredients to be processed within chamber 116 and also an outlet port 132 for removal of the content of the chamber, for example, in a cleaning cycle that involves circulation of the cleaning fluid. The cooling chamber also includes a cooling fluid entry port 134 and a cooling fluid exit port 136. While it is preferred that the cooling fluid will be introduced at the bottom and removed at the top (which is the reason for ports 134 and 136 being so positioned), the role of ports 134 and 136 may also be reversed.

Figure 3:
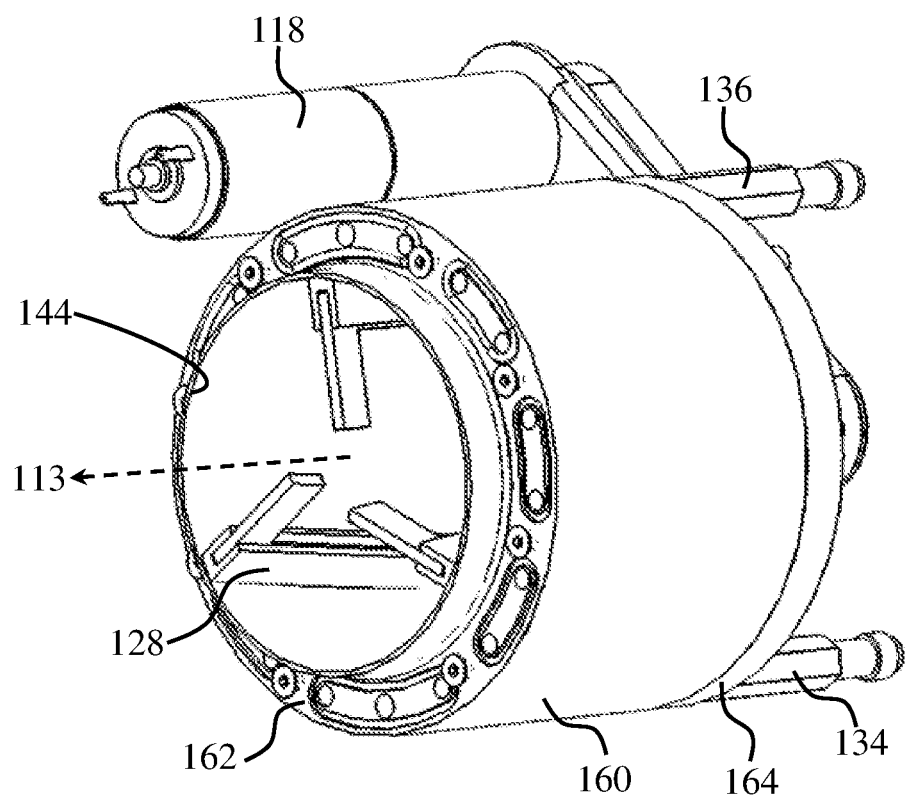
FIG. 3 is a schematic perspective view of the chamber of FIG. 2, from a different angle, showing the blades within the chamber.
Figure 4:
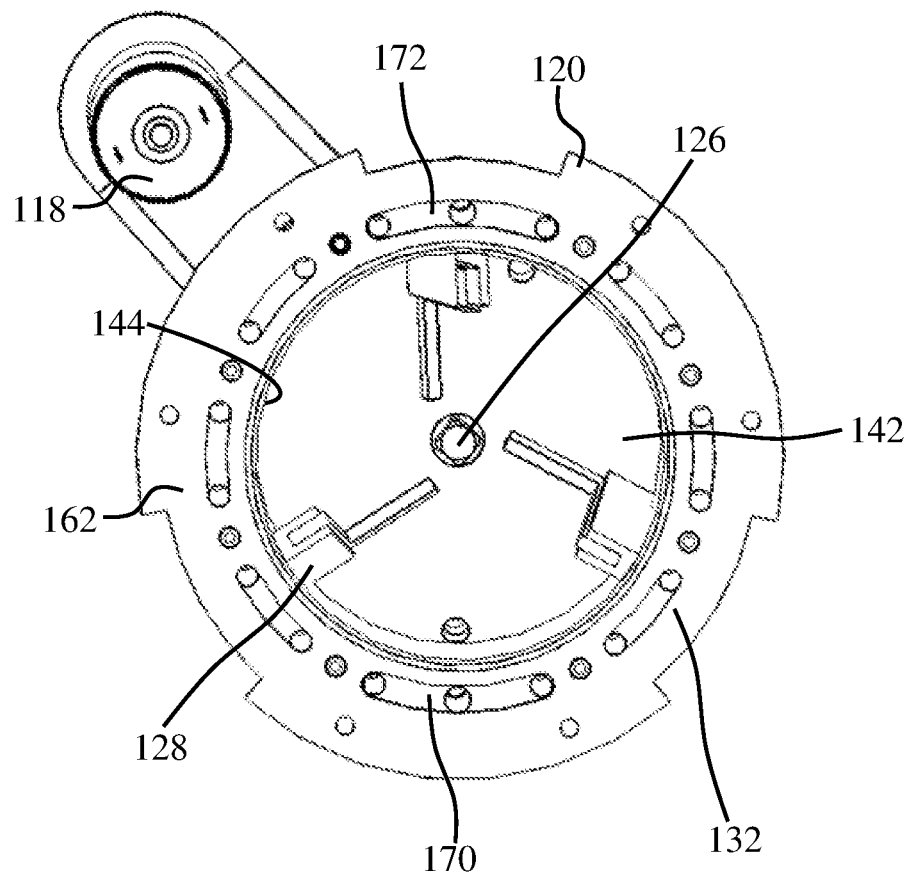
FIG. 4 is a schematic front elevation of the cooling chamber.
Figure 5:
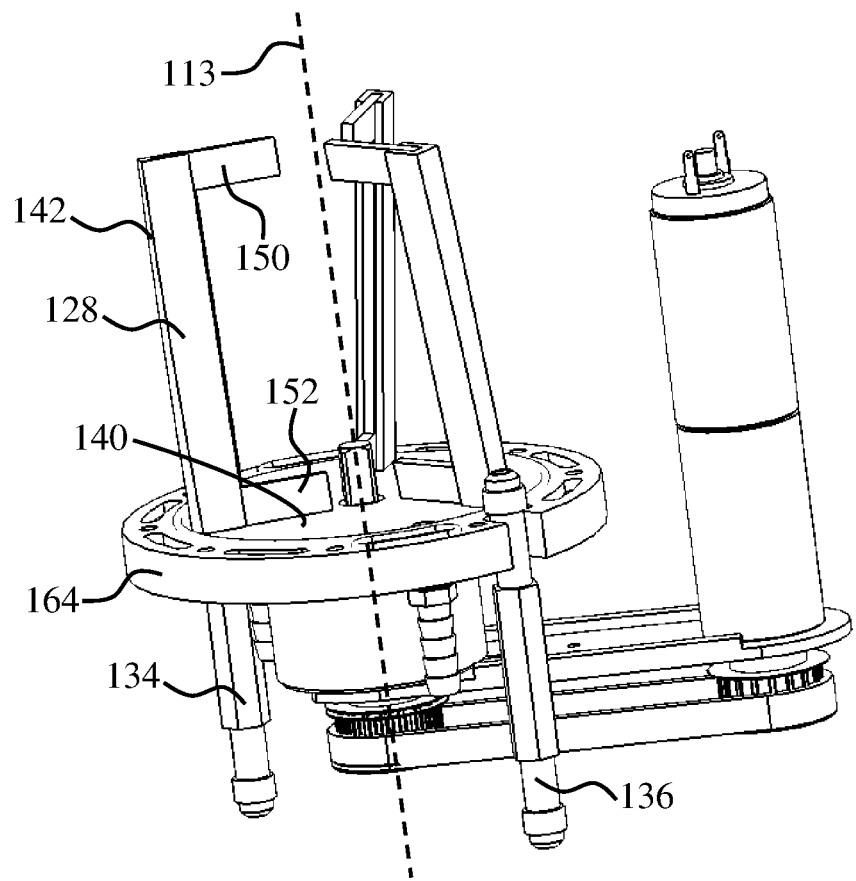
FIG. 5 is a schematic representation of the cooling chamber with the walls removed to illustrate the structure of the blending arrangement.
Figure 6A:
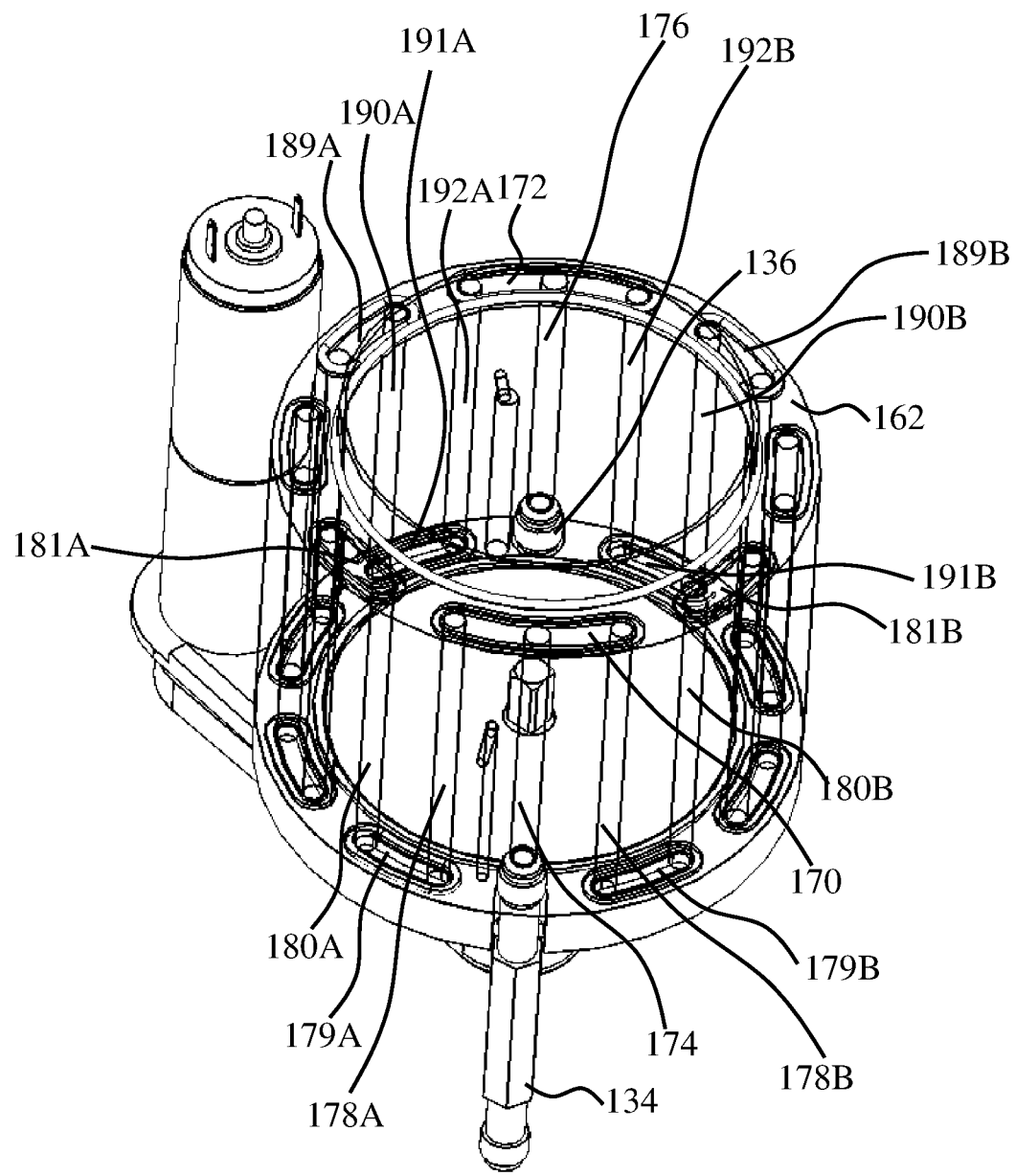
FIG. 6A shows a schematic representation of the cooling chamber with the walls being made transparent and blades having been removed, to illustrate the conduit systems.
Figure 6B:
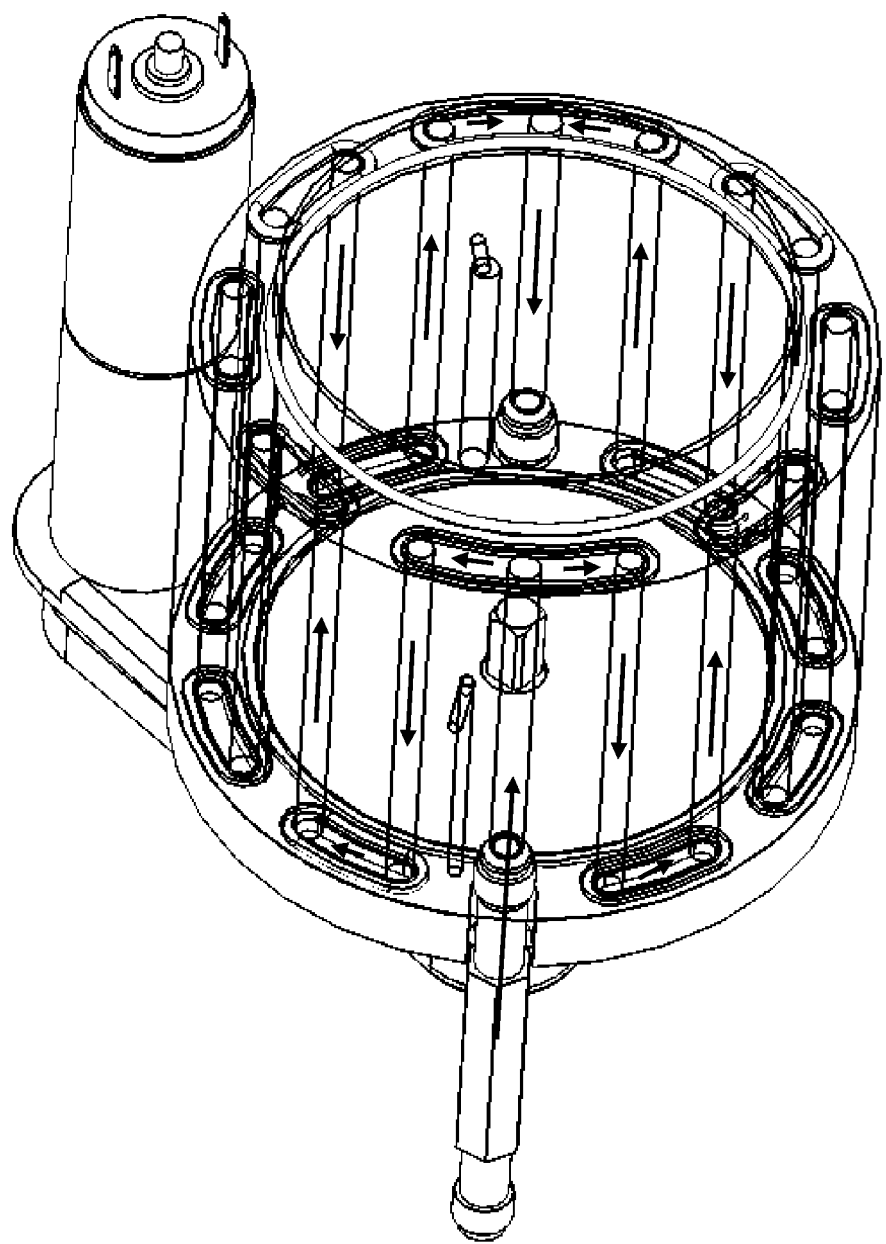
FIG. 6B is the same representation as in FIG. 6A with arrows illustrating the direction of flow of the cooling fluid.

The cooling chamber 116 is typically cylindrical and is defined by a circumferential wall 160, that extends between front and back end plates 162 and 164. The cooling chamber defines a longitudinal axis 113, as seen in FIG. 3.

Blades 128 are fixed to a revolving plate 140, that is coupled to axel 126 and revolved thereby about axis 113, thus causing revolving of the blades 128. The blades each have a peripheral edge 142 which is in close proximity to the internal circumferential wall 144 of the cylindrical cooling chamber 116. In consequence of the axial revolution of the blending arrangement, the blades constantly scrape the internal wall of the cooling chamber, removing frozen/solidified food from the walls and agitating the entire content of the chamber. As noted above, the blending arrangement typically rotates at a rate of at least 200 rpm, preferably at least 400, 500, 600, 700 and at times about 800 rpm or even higher. The blades 128, as can be seen, are arranged in an off-axial angle relative to axis 113. As can be appreciated, other than such an oblique orientation, in other embodiments the blades may be axially orientated, curved, etc. The blades have associated lateral internally projecting end portions 150 and 152 to improve agitation and induce some shearing force on the content of formed cooled edible product within the chamber.

The internal walls of the cooling chamber 116 are cooled by a cooling fluid which flows within conduits formed in the circumferential and end walls, as will now be explained. These conduits, which are an embodiment of the cooling fluid flow system generally described above, and thus the cooling chamber 116 is also an embodiment of the cooling chamber aspect described above.

Formed within end wall 162 are entry manifold element 170 and an exit manifold element 172, in fluid communication with entry and exit ports 134 and 136 via axial conduits 174 and 176, respectively. The entry and exit manifolds may be defined by cavities formed in end wall 162 or by planar elements that are associated with the face of end wall 162. In this particular example, the manifold elements are in fluid communication two conduit systems that define corresponding two cooling fluid flow paths between the entry and exit manifolds.

One of the two conduit systems is defined by a plurality of axially directed first conduit segments 178A, 180A, . . . , 190A and 192A formed within circumferential wall 160 and a plurality of peripheral second segments 179A, 181A, . . . , 189A and 191A formed at the end walls. Each peripheral segment links between two consecutive axial segments, thereby forming a flow path from the entry port 134 to the exit port 136. The other of the two conduit systems is similarly defined by a plurality of axially directed first conduit segments 178B, 180B, . . . , 190B and 192B formed within circumferential wall 160 and a plurality of peripheral second segments 179B, 181B, . . . , 189B and 191B formed at the end walls.

The manner by which the cooling fluid flows through the conduit systems will now be described with reference to one of the two conduit systems. It is to be understood that the other one of the two conduit systems is similarly formed from its relevant conduit segments.

Cooling fluid is introduced into the conduit system via entry port 134 The entry port is in fluid communication via axial segment 174 with entry manifold element 170, which functions to divide the stream of the cooling fluid into two streams; each such stream flows into one of the two conduit systems. As better seen in FIG. 6B (in which the direction of the flows through the system are shown), once split, the cooing fluid flows from the manifold element into axial segment 178A, from there to peripheral segment 179A (formed in end wall 164), and from there to axial segment 180A. Thus, the peripheral segment 179A fluidly links between consecutive axial segments 178A and 180A. Similarly, each peripheral segment links between two consecutive axial segments along the flow path. The second flow path (designated by the same numbered elements, however with the index B instead of A) is formed in a similar manner. Fluids from axial segments 192A and 192B enter exit manifold element 172, in which the two streams are unified into a single exit stream that exists the cooling system via axial conduit 176 to exit port 136.

In the manner described, there is efficient cooling of the entire chamber. Such a structure also minimizes the accumulation of cooling fluid at the bottom part of the heat exchanger, thus enabling better circulation of the cooling fluid and maintaining cooling efficiency of the cooling system.

It should be noted that it is possible, through a variety of design configurations, to define more than two flow paths for the cooling liquid in a cooling chamber of this disclosure. For example, there may be one manifold that splits the flow into two, which is then directed to two manifolds, which again split the flow such that there are parallel flows in each quarter of the circumferential wall, or use of a manifold that separates the flow into four different conduit systems, etc.

Figure 7:
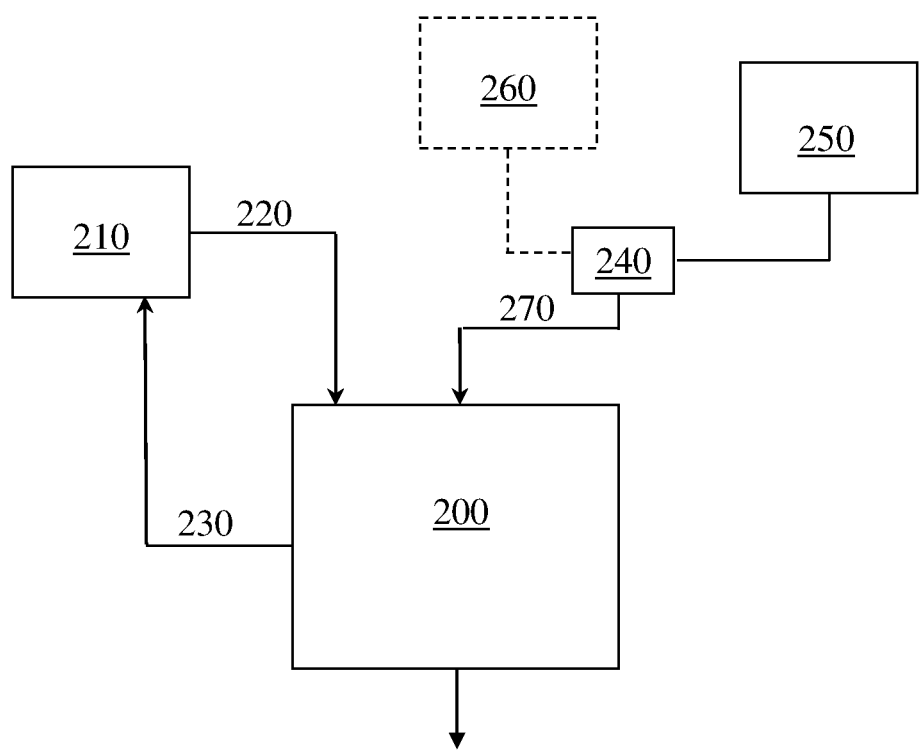
FIG. 7 is a schematic, block diagram illustration of an appliance in accordance with embodiments of this disclosure.

FIG. 7 is a block diagram describing some elements of the appliance. The cooling chamber 200, which may be that described above, receives supply of cooling fluid from the refrigeration unit 210 via circular flow path as described by arrows 220, 230. A pump 240 is linked to a capsule coupling unit 250 and to a source of aqueous liquid 260 and can thus pump a mixture that includes the content of the capsule and the liquid into the chamber 200, as represented by fluid line 270.

The pumping action forces the food ingredients into the chamber and this forced introduction increases pressure within the chamber. As noted above, without wishing to be bound by theory, it is believed that this combination increases the pressure within the chamber. The abrupt introduction at the point of entry of the food ingredients into the chamber and the agitation which is induced by a shearing force provides optimized conditions for preparation of a quality cooled edible product, such as ice cream, as well as significantly reduced duration of production (typically below 90 seconds or even below 60 seconds per production cycle).

The invention claimed is:

1. A cooling chamber having a cylindrical shape with an axis defined between end walls and a circumferential axial wall, and comprising
    a cooling fluid entry port and a cooling fluid exit port connectable to respective source and drain of a cooling fluid;
    a heat exchanger within walls of the cooling chamber for circulating the cooling fluid between the source and the drain, and comprising
        an entry manifold element, defined as a cavity within one of the end walls, being associated and in fluid communication with said entry port, and
        an exit manifold element, defined as a cavity within said one of the end walls, being associated and in fluid communication with said exit port, the entry manifold element and the exit manifold element being in fluid communication with at least two conduit systems defining at least two cooling fluid flow paths between the entry and exit manifold element, said conduit systems being constituted by consecutive conduit segments, the conduit segments being bores or cavities formed within the walls of the cooling chamber, each of the at least two conduit systems comprises a plurality of axial segments spanning the distance between said two end walls and defined as bores in the circumferential axial wall, and a plurality of peripheral segments formed in the end walls, each of said peripheral segments linking two axial segments that are consecutive in said flow path.

2. The cooling chamber of claim 1, comprising two conduit systems in opposite portions of the circumferential wall.

3. The cooling chamber of claim 2, wherein each of said portions is half the circumference.

4. A cooling system comprising a cooling chamber having a cylindrical shape with an axis defined between end walls and a circumferential axial wall;
a source and a drain of cooling fluid;
a heat exchanger within walls of the cooling chamber;
said heat exchanger being configured for circulating the cooling fluid between the source and the drain, and comprising a cooling fluid entry port and a cooling fluid exit port,
an entry manifold element defined as a cavity within one of the end walls, being associated and in flow communication with the entry port, and
an exit manifold element defined as a cavity with said one of the end walls, being associated and in flow communication with the exit port,
the entry manifold element and the exit manifold element being in fluid communication with at least two conduit systems defining at least two cooling fluid flow paths between the entry and exit manifold elements, said conduit systems being constituted by consecutive conduit segments, the conduit segments being bores or cavities formed within the walls of the cooling chamber,
each of the at least two conduit systems comprises
a plurality of axial segments spanning the distance between said two end walls and defined as bores in the circumferential axial wall, and
a plurality of peripheral segments formed in the end walls, each of said peripheral segments linking two axial segments that are consecutive in said flow path.

5. The cooling system of claim 4, wherein the at least two conduit systems comprise two conduit systems in opposite portions of the circumferential wall.

6. The cooling system of claim 4, wherein each of said portions is half the circumference.

* * * * *